United States Patent [19]

Day, V et al.

[11] Patent Number: 4,813,216

[45] Date of Patent: Mar. 21, 1989

[54] APPARATUS AND METHOD FOR AUTOMATED TOBACCO HARVESTING

[75] Inventors: George B. Day, V; Larry G. Wells; Timothy D. Smith; Ira J. Ross, all of Lexington, Ky.

[73] Assignee: University of Ky. Research Foundation, Lexington, Ky.

[21] Appl. No.: 10,176

[22] Filed: Feb. 2, 1987

[51] Int. Cl.$^4$ ............................................. A01D 45/16
[52] U.S. Cl. ..................................... 56/27.5; 56/327.1
[58] Field of Search ...................... 56/27.5, 14.5, 14.6, 56/327 R, 327 A; 171/61; 74/128

[56] References Cited

U.S. PATENT DOCUMENTS

| | | | |
|---|---|---|---|
| 3,902,607 | 9/1975 | Middleton | 56/27.5 |
| 3,921,824 | 11/1975 | Larroche | 56/27.5 |
| 3,997,066 | 12/1976 | Thielen | 56/27.5 |
| 4,016,985 | 4/1977 | Green et al. | 56/27.5 |
| 4,037,392 | 7/1977 | Taylor et al. | 56/27.5 |
| 4,180,965 | 1/1980 | Vedvig | 56/27.5 |
| 4,303,364 | 12/1981 | Pinkham | 56/27.5 |

FOREIGN PATENT DOCUMENTS 1158080  5/1985  U.S.S.R. ............................. 56/27.5

OTHER PUBLICATIONS

L. G. Wells et al., "Evaluation of an Inverting Conveyor for Stalk-Cut Burley Tobacco", Dec., 1982, pp. 1–17.
J. H. Casada et al., "Harvesting, Handling and Curing Notched Burley Plants on Wires", 1986, Jan.-Feb., pp. 267–275.

Primary Examiner—Paul J. Hirsch
Attorney, Agent, or Firm—King & Schickli

[57] ABSTRACT

An apparatus and method for automated harvesting are providing. The apparatus includes a mechanism for cutting the stalks of plants being harvested adjacent the ground. An inclined conveyor grasps the cut stalks and elevates them above the ground. The conveyor includes two corners that serve to partially invert the plants as they are conveyed. Cooperating inversion disks at the end of the inclined conveyor complete the inversion of the stalks through 180°. After the stalks are inverted they are conveyed on a spacing and notching conveyor. The spacing and notching conveyor operates at a slower speed than the inclined conveyor so as to reduce the spacing between the inverted plants to a distance appropriate for curing. A notching mechanism cuts two opposed, laterally spaced notches in the stalks of the inverted plants as they are conveyed. The plants are then substantially continuously fed by a feed conveyor so that the notched stalks are received and held within a slotted track of a portable frame allowing subsequent curing. The apparatus also includes mechanisms for (1) dispensing a portable frame from a magazine rack of frames on the harvester to a position for receiving plants; (2) indexing the frame relative to the feed conveyor so as to allow ordered, sequential filling of multiple slotted tracks on the frame; and unloading filled frames from the harvester. The notching and indexing mechanisms as well as a method of harvesting are also claimed.

39 Claims, 8 Drawing Sheets

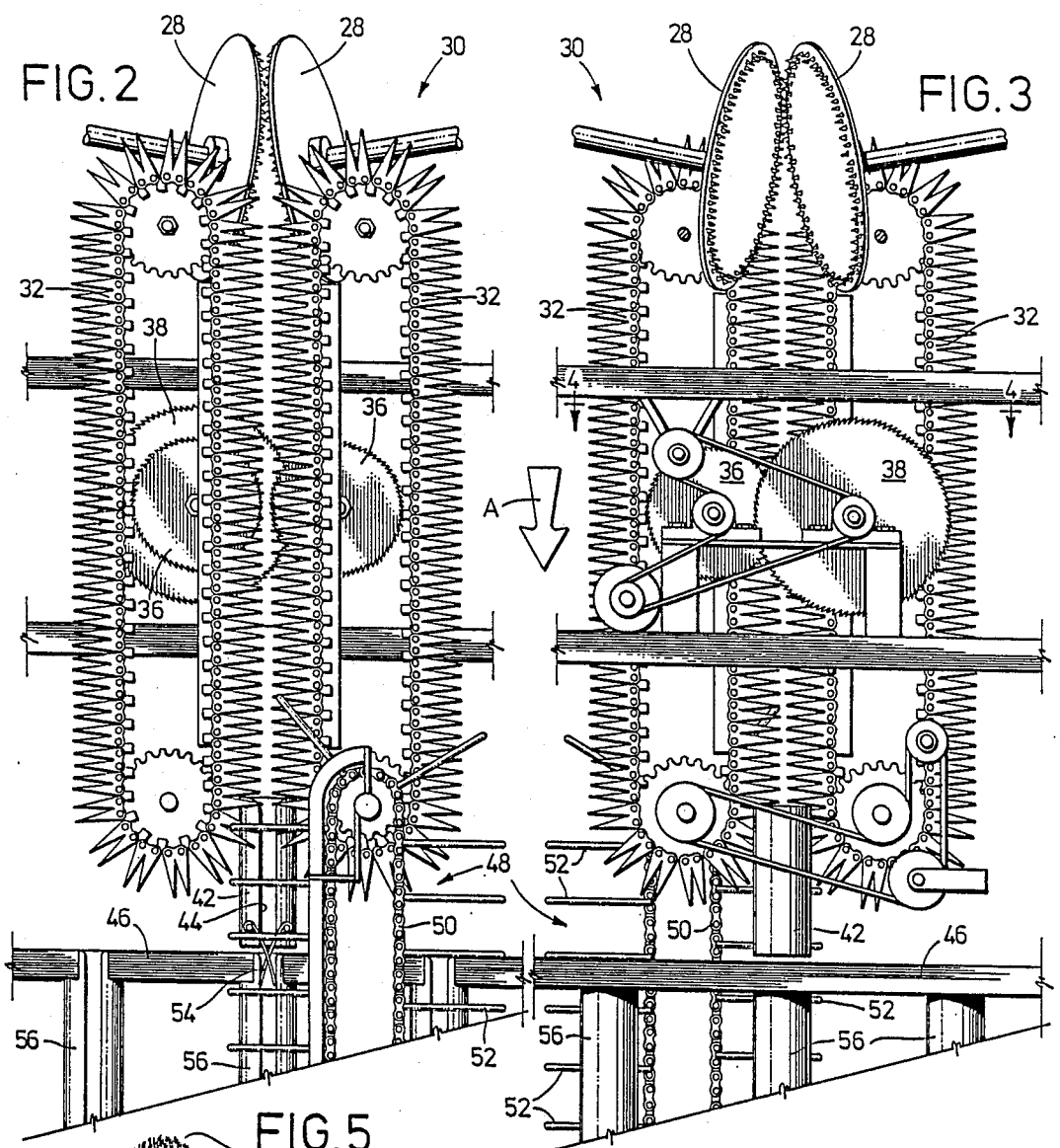

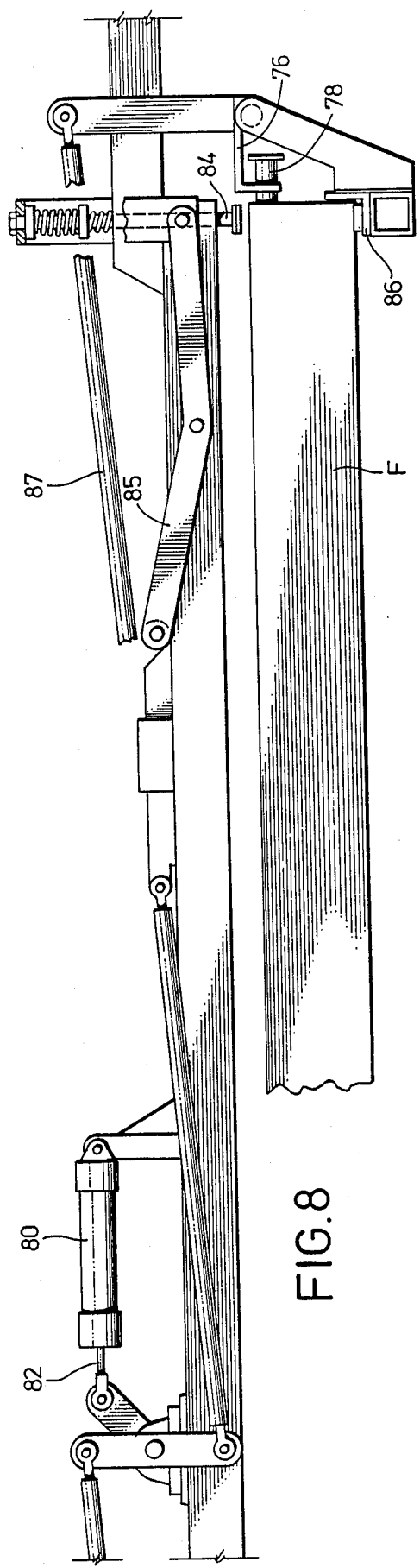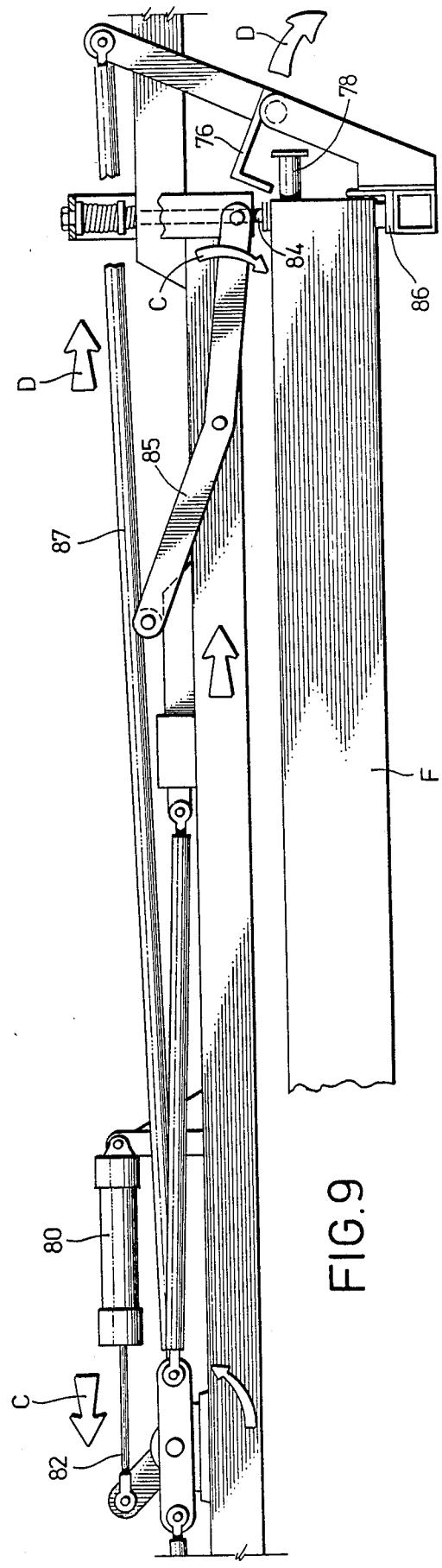

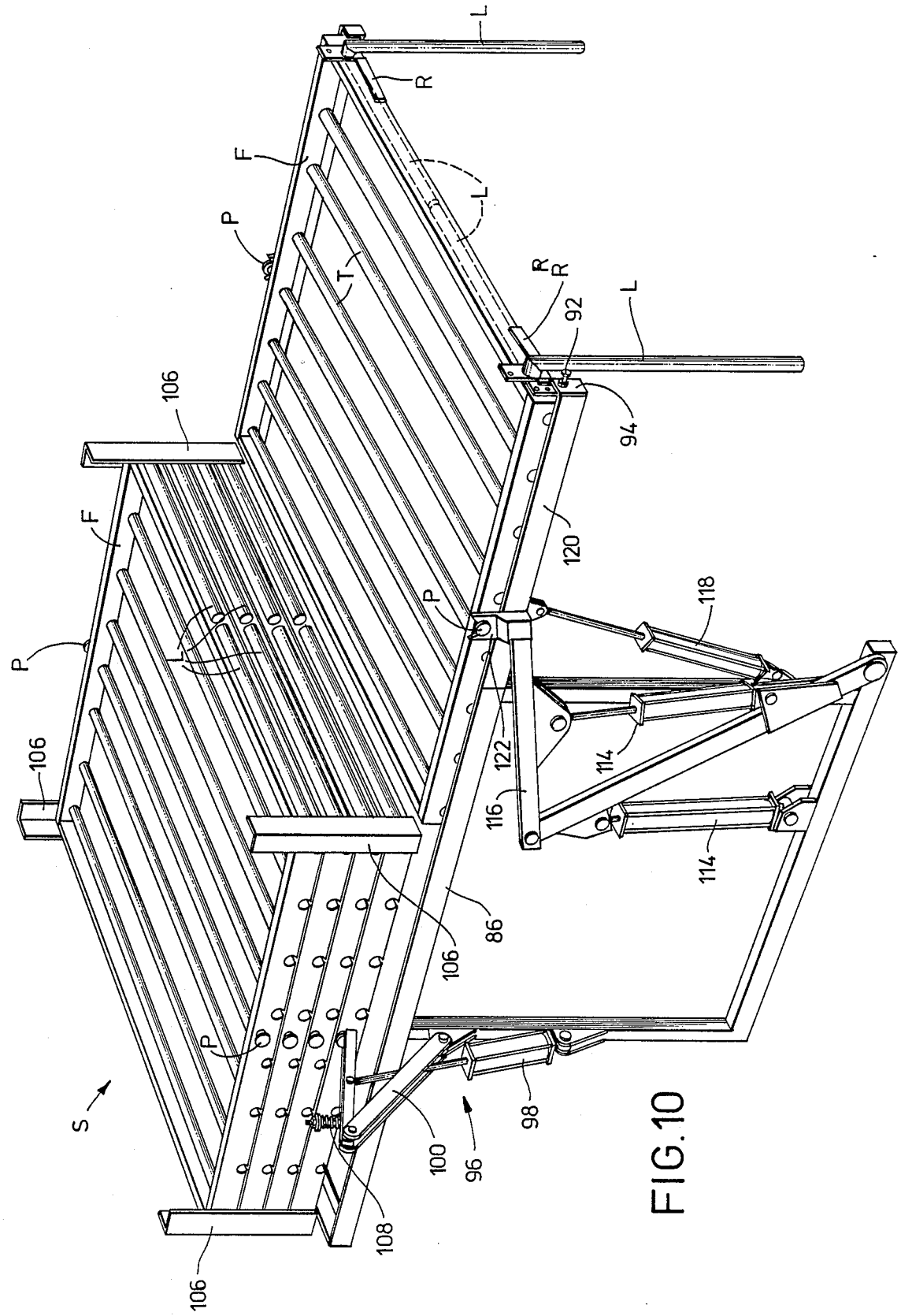

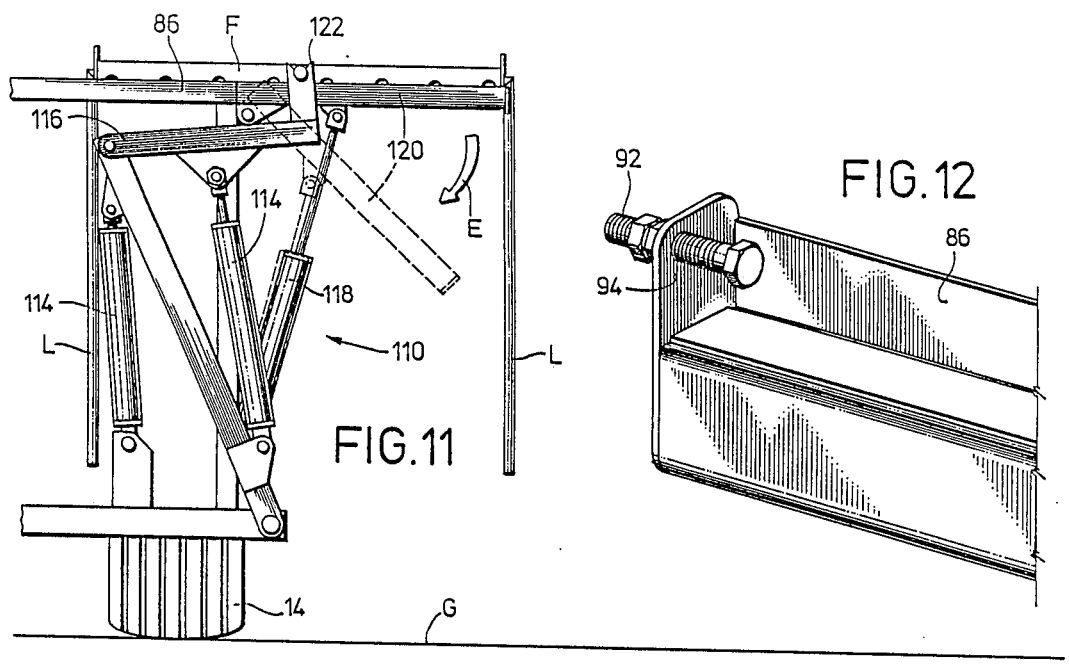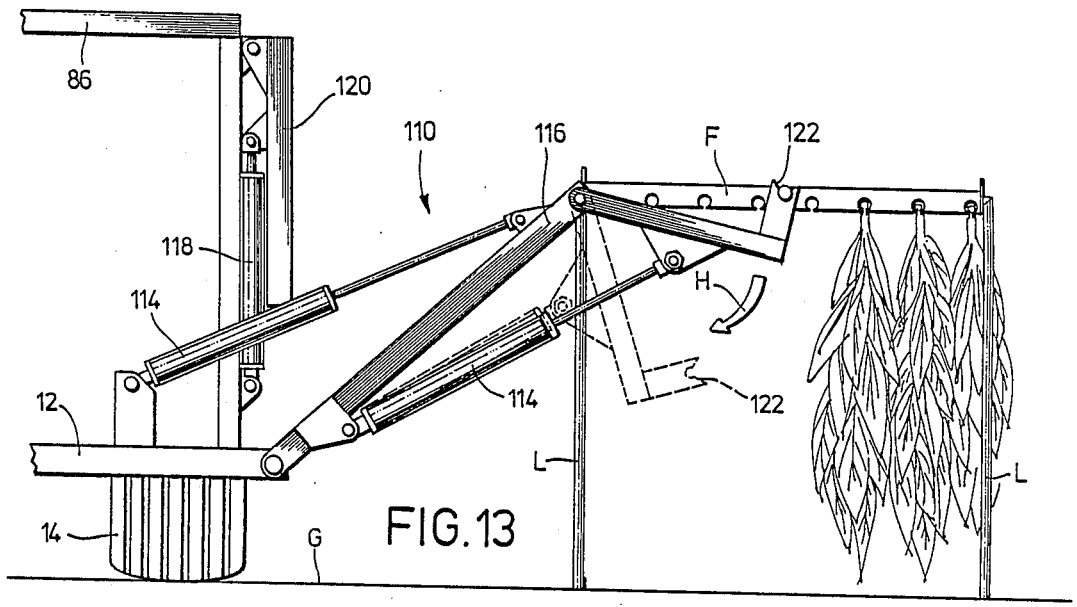

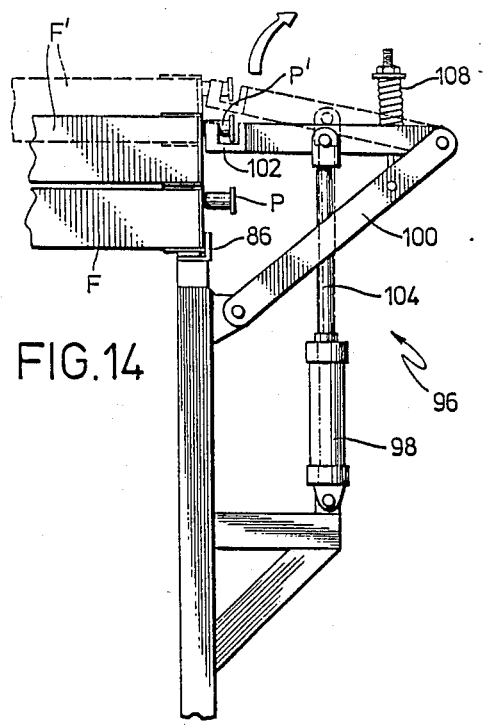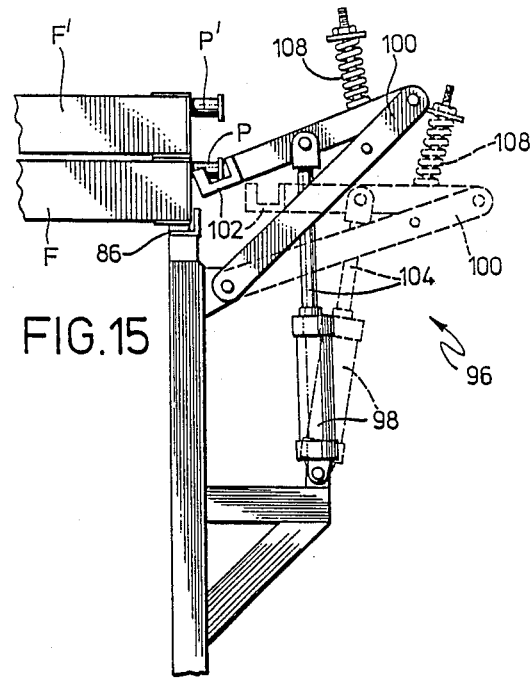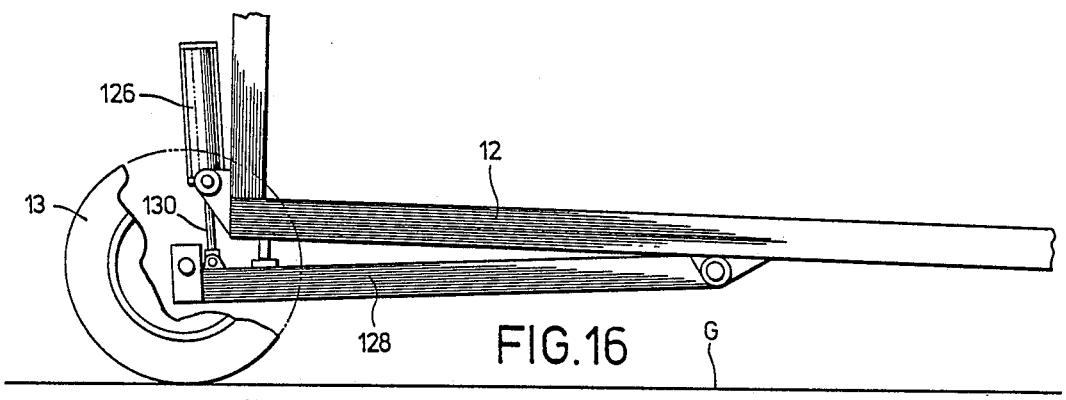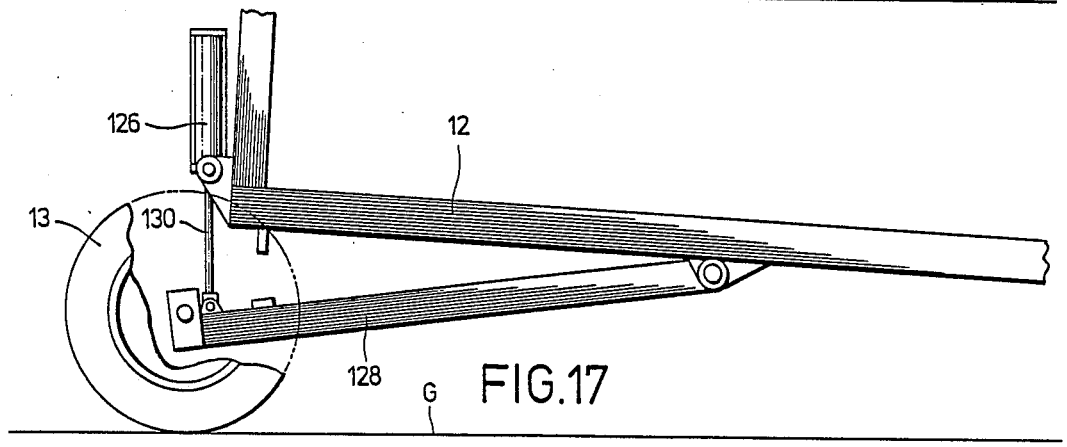

APPARATUS AND METHOD FOR AUTOMATED TOBACCO HARVESTING

TECHNICAL FIELD

The present invention relates generally to harvesting of plants and, more particularly, to an automated harvester and related method for the substantially continuous harvesting of burley tobacco or similar plants and delivering of the plants to a portable frame for curing.

BACKGROUND OF THE INVENTION

Burley tobacco harvesting remains to this day an essentially manual operation. Tobacco is harvested by first cutting plants near the ground. Five or six plants are then impaled upon a wooden stick having dimensions of substantially $1 \times 1 \times 54$ inches. Tobacco-laden sticks are left in the field for several days until such time as the tobacco plants wilt. The sticks are then collected and transported to a curing barn. The sticks are placed or stored at spaced intervals on parallel rails in the curing barn. The inverted plants hang down from the sticks between the rails with the necessary spacing between the plants for on-the-plant curing of the leaves by natural ventilation.

As with any labor intensive procedure, the harvesting of tobacco in the manner described above is a relatively slow process. In fact, the harvesting and housing operation described above normally requires between 140–160 labor hours per hectare of tobacco. Further, with limited skilled labor available, the process is also relatively expensive.

Despite a clear need for a less expensive and faster harvesting procedure, up to this point in time, no commercially successful, fully automated apparatus or method of harvesting tobacco has been developed. The primary reason for this failure appears to be related to the fact that burley tobacco plants are highly susceptible to leaf damage and loss. This problem is the result of leaf turgidity, plant size and orientation of leaves on the plant. These factors clearly limit the extent to which any mechanical component can engage a burley plant and still provide effective harvesting.

A need is, therefore, identified for an automated harvester designed to rapidly, yet carefully handle and manipulate the burley plants and thus reduce leaf losses during cutting and storing to a level previously only achievable by the most skilled manual laborers.

SUMMARY OF THE INVENTION

Accordingly, it is a primary object of the present invention to provide both a more efficient apparatus and a method for harvesting plants, such as burley tobacco, that is less labor intensive.

Another object of the present invention is the provision of a fully automated harvester furnishing increased harvesting speeds of up to 0.5 acres per hour at a leaf or crop loss rate substantially equivalent to that achievable only by the most skilled manual laborers.

Yet another object of the present invention is the provision of an automated harvester system adapted for use with portable curing frames that automatically feeds plants into the frames at proper spacing for curing. Further, these frames may then be covered with plastic or other material to allow curing of the plants in the field. Thus, the present system and method of harvesting eliminates the need of the farm operator to construct and maintain curing barns as required with past methods of tobacco harvesting.

Still another object of the present invention is to provide an efficient mechanism for notching plant stalks for subsequent receipt in a slotted track of a portable curing frame.

An additional object to the present invention is the provision of a rapid and reliable mechanism for indexing a portable frame across a harvester in order to sequentially bring a series of slotted tracks on the frame into position for loading with plants.

A further object of the present invention is the provision of an automated harvester that may be adapted to remove plants from frames following curing for shipment to the marketplace.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved automated harvester system is provided for more efficient harvesting of tobacco and like plants. The apparatus includes a means, such as a circular saw, for cutting the stalks of the plants adjacent the ground as the harvester moves along a row of plants in the field. An inclined L-shaped conveyor simultaneously grasps the plants near the cut-off point. The plants are conveyed upward and rearward at an angle of approximately 45° in their original vertical orientation to an approximate height of 12'.

The pickup conveyor is operated at a speed having a horizontal component substantially equal to the speed of travel of the harvester along the row of plants. Thus, the field spacing of the plants is approximately maintained as the plants are elevated by the conveyor. This minimizes contact between the plants during conveyance and thereby prevents one cause of leaf damage and loss.

As the plants are conveyed around the two corners of the L-shaped pickup conveyor, they are reoriented through substantially 90° so as to extend approximately parallel to the ground. Adjacent the trailing end of the pickup conveyor, a pair of cooperating inversion disks securely engage and grasp the plant stalks extending beneath the plane of the conveyor. The inversion disks serve not only to transfer the plants to a separate spacing and notching conveyor but also complete the inversion of the plants through 180° so that the plants are extending substantially perpendicular to the ground with the cut base of the stalks located directly above the top of the plants. When plants are inverted in this manner, gravity causes the leaves to align along the plant stalk. Thus, the plants may be brought closer together for curing with minimum leaf damage due to plant-to-plant contact.

The spacing and notching conveyor conveys the plants horizontally rearward at a slower velocity than the horizontal component of the inclined conveyor. The velocity differential between the two conveyors reduces the spacing between adjacent plants from spacing found in the field to that desired for air curing.

The spacing and notching conveyor also conveys the plants through a notching mechanism that notches the plants adjacent the previously cut ends of the stalks. More specifically, the notching mechanism may comprise a stack of circular saw blades approximately $\frac{5}{8}''$ in height that are mounted on vertical shafts above and on both sides of the spacing and notching conveyor. The lateral clearance between the saw blades may be adjusted between, for example, $\frac{1}{4}''$ and $\frac{1}{2}''$ depending on the type of tobacco being harvested. Preferably, however, the lateral clearance is approximately $\frac{1}{2}''$ so as to provide a notched area of the stalk with superior strength.

The base portion of the plant stalks extending above the spacing and notching conveyor pass between the opposed stacks of saw blades and a $\frac{5}{8}''$ notch is cut on opposite sides of the stalk leaving $\frac{1}{2}''$ of interior material intact. A separate saw blade mounted to one of the vertical shafts is provided for tipping the stalks as the plants are continuously conveyed by the spacing and notching conveyor. This tipper saw blade completely severs the stalk above the notches to ensure a uniform margin providing adequate clearance for receipt of the stalks inside a continuous-slotted track that holds the stalks during subsequent curing. A series of these slotted tracks may be positioned on a single portable curing frame as fully described and set forth in our copending patent application Ser. No. 009,949 filed Feb. 2, 1987, and entitled Portable Curing Frame; the disclosure of which is hereby incorporated into this document.

Following notching, the plants are delivered by the spacing and notching conveyor to a stationary slotted feed track that receives the notched stalks. The feed track may be in the form of a tube including longitudinal opening extending in a downward direction. Advantageously, the wall of the tube covers and protects the margins of the stalks adjacent the notches thereby preventing inadvertent damage to the margins and one means of possible loss of the plants from the harvester.

At this point a feed conveyor in the form of a roller chain with lateral tines engages the plants below the feed tube and pushes them toward the rear of the harvester into a slotted track on a portable curing frame. The feed conveyor may be time operated as, for example, by a step motor to ensure that only one plant is engaged by each lateral tine and thereby guarantee proper spacing for curing. This timed operation also prevents any possibility of spearing and severing of the stalks with the tines, thus further reducing plant losses.

A limit switch on the harvester closes when the lead plant reaches the rearward most position of the slotted track on the portable curing frame. The operation of the limit switch initiates a sequence which displaces the portable frame laterally so as to align the next slotted track of the frame with the feeding conveyor.

Advantageously, the indexing mechanism that displaces the portable curing frame to align the next track operates so as to complete the entire movement within substantially $\frac{1}{2}$ second or less. Thus, feed conveyor operation is substantially continuous and uninterrupted during portable frame indexing. As a result, maximum efficiency of operation is assured.

The indexing mechanism includes an actuator for driving a bell crank linkage. This linkage assures fast, smooth and reliable operation. More specifically, the linkage provides a smooth index of the frames due to the acceleration and deceleration characteristic of a bell crank linkage as well as perfect alignment of the next slotted track of the curing frame with the feed track and conveyor.

A pivotally mounted slotted carrier in the form of an angle iron engages a control pin centrally located on an end of the portable frame. This carrier is displaced by the actuator and linkage between a frame movement initiating position and a frame advancing position. The carrier is displaced to the advancing position to index the frame and bring the next slotted track into proper feeding position.

Following indexing of the portable curing frame, a braking and pivoting mechanism is activated. This mechanism serves to clamp the portable curing frame in position on the track on which it rests. It also serves to pivot the carrier so as to release the carrier slot from engagement with the control pin on the curing frame. The actuator may then be operated or recycled to return the carrier to the initiating position. Upon return to the initiating position, the carrier is pivoted to bring the next slot in the series into engagement with the control pin of the portable frame and the brake is simultaneously released. This operation is repeated until all of the slotted tracks of the curing frame are filled.

The portable curing frame is then advanced again along the guide track. This time, however, a trigger pin on the frame is brought into engagement with a passive trip switch at the end of the frame guide track on the harvester. A counter in the controller temporarily suspends the operation of the frame indexing and harvesting systems until frame dispensing and unloading operations are completed.

The dispensing mechanism positions the next portable frame on the track for loading. A lift arm engages the control pin at an end of the frame and is driven by an actuator so as to lower the next frame from a magazine stack onto the guide track. The arm is then disengaged from that frame and brought into engagement with the control pin on the next overlying frame. All of the overlying frames in the stack are then lifted upwardly by the lift arm out of engagement with the lowermost portable frame now resting on the track. Following dispensing, the indexing mechanism is reactivated and the carrier returned to the initiating position and pivoted into engagement with the control pin of the frame just delivered to the guide track.

Next, the plant-laden frame is ready for unloading from the harvester. The unloading mechanism includes actuators that are operated to bring a control arm at an end of the portable curing frame into engagement with the control pin on the frame. The frame is lifted slightly with the arm and an end section of the guide track on which the frame rests during indexing is then displaced to a retracted position. This provides sufficient clearance to allow the portable curing frame to be unloaded from the harvester. The control arm of the unloading mechanism is manipulated to set the plant-laden curing frame on its legs on the ground clear of the harvester. After unloading, the arm of the unloading mechanism is returned to the normal retracted position and the displaceable track section is reextended for supporting the next portable curing frame to be loaded with plants. A reset switch is triggered and the controller once again initiates harvesting operations.

Preferably, the harvester also includes a guidance control system that maintains the harvester in proper alignment as it travels along the row of plants. The guidance system reduces labor requirements and associated expenses. Additionally, the harvester may include a mechanism for adjusting the cutting height. This is an important feature that allows the operation of the harvester to be adjusted relative to the type and condition of tobacco to be harvested.

In accordance with yet another aspect of the present invention, a method of harvesting tobacco or like plants is provided. The method includes the initial step of cutting the stalks of the plants adjacent the ground. Next is the steps of conveying, elevating and inverting the cut plants. Following inverting, the plants are notched adjacent the previously cut ends of the stalks during conveying. After notching, the method includes the step of feeding the cut and notched plants onto the portable frames.

As described above, the method may include the additional steps of indexing and dispensing the portable curing frames. More specifically the frames are automatically indexed so as to sequentially bring multiple slotted tracks on the frames into position for feeding with the plants being harvested. Preferably, for maximum harvesting efficiency, the feeding of plants is continuous during the indexing operation. When one frame is filled, a new frame is dispensed from a magazine stack and placed directly in position to receive notched plants.

The method may also include the step of unloading the plant-laden portable frames from the harvester. Further, following curing of the plants, the harvester may be utilized to automatically unload plants from the portable frames and restack the frames for storing. This allows a reduction in labor costs and provides the farm operator with the ability to quickly proceed to market with cured tobacco.

Additional steps of the method relate to adapting to specific operating and/or plant conditions. More particularly, the method may include the additional step of adjusting the operating height of the harvester relative to the plants in the field. Further, the method may provide for automatically adjusting the spacing between the plants as found in the field to spacing appropriate for curing on the portable frames. This is accomplished by controlling the operating speeds of the various harvester conveyors and adjusting these speeds relative to one another. Leaf losses of as low as 1% are possible since all plant processing, including the notching of stalks, takes place after the plants are inverted. When inverted, the leaves are closely aligned along the stalks and relatively protected from damage.

Still other objects of the present invention will become readily apparent to those skilled in this art from the following description wherein there is shown and described a preferred embodiment of this invention simply by way of illustration of one of the modes best suited to carry out the invention. As will be realized, the invention is capable of other different embodiments, and its several details are capable of modifications in various, obvious aspects all without departing from the invention. Accordingly, the drawings and descriptions will be regard as illustrative in nature and not as restrictive.

BRIEF DESCRIPTION OF THE DRAWING

The accompanying drawing incorporated and forming a part of the specification, illustrates several aspects of the present invention, and together with the description serves to explain the principles of the invention. In the drawing:

FIG. 2 is a bottom plan view of the spacing and notching conveyor of the present invention;

FIG. 3 is a top plan view similar to FIG. 2;

FIG. 4 is a cross-sectional view taken along line 4—4 of FIG. 3 showing the mechanism for notching and tipping plant stalks;

FIG. 5 is a perspective view of a pair of tobacco plant stalks showing one stalk as cut from the ground and another stalk following passage through the notching and tipping mechanism;

FIG. 8 is a cut-away side elevational schematic view showing the braking and pivoting mechanism in the rest position;

FIG. 9 is a view similar to FIG. 8 showing the braking and pivoting mechanism in the operative position;

FIG. 10 is a schematical perspective view with parts of the indexing mechanism removed for clarity to show portable curing frames in the magazine rack as well as the dispensing arm and the control arms of the unloading mechanism;

FIG. 11 is a schematical end view showing the displaceable end track section and the portable frame unloading mechanism;

FIG. 12 is a cut-away perspective view showing the passive actuator that releases the leg locking mechanism of the portable curing frames to allow the legs to drop into the extended, substantially vertical position;

FIG. 13 is a view similar to FIG. 11 showing the portable curing frame resting on the ground clear of the harvester;

FIG. 14 is a side elevational view showing the lifting of a portable curing frame with the lift arm of the dispensing mechanism;

FIG. 15 is a view similar to FIG. 14 showing the disengagement of the lift arm of the dispensing mechanism from a portable curing frame resting on the harvester track;

FIGS. 16 and 17 are schematical side elevational views showing the harvester height adjusting mechanism in respective lowered and raised positions.

Reference will now be made in detail to the present preferred embodiment of the invention, an example of which is illustrated in the accompanying drawing.

DETAILED DESCRIPTION OF THE INVENTION

Figure 1:
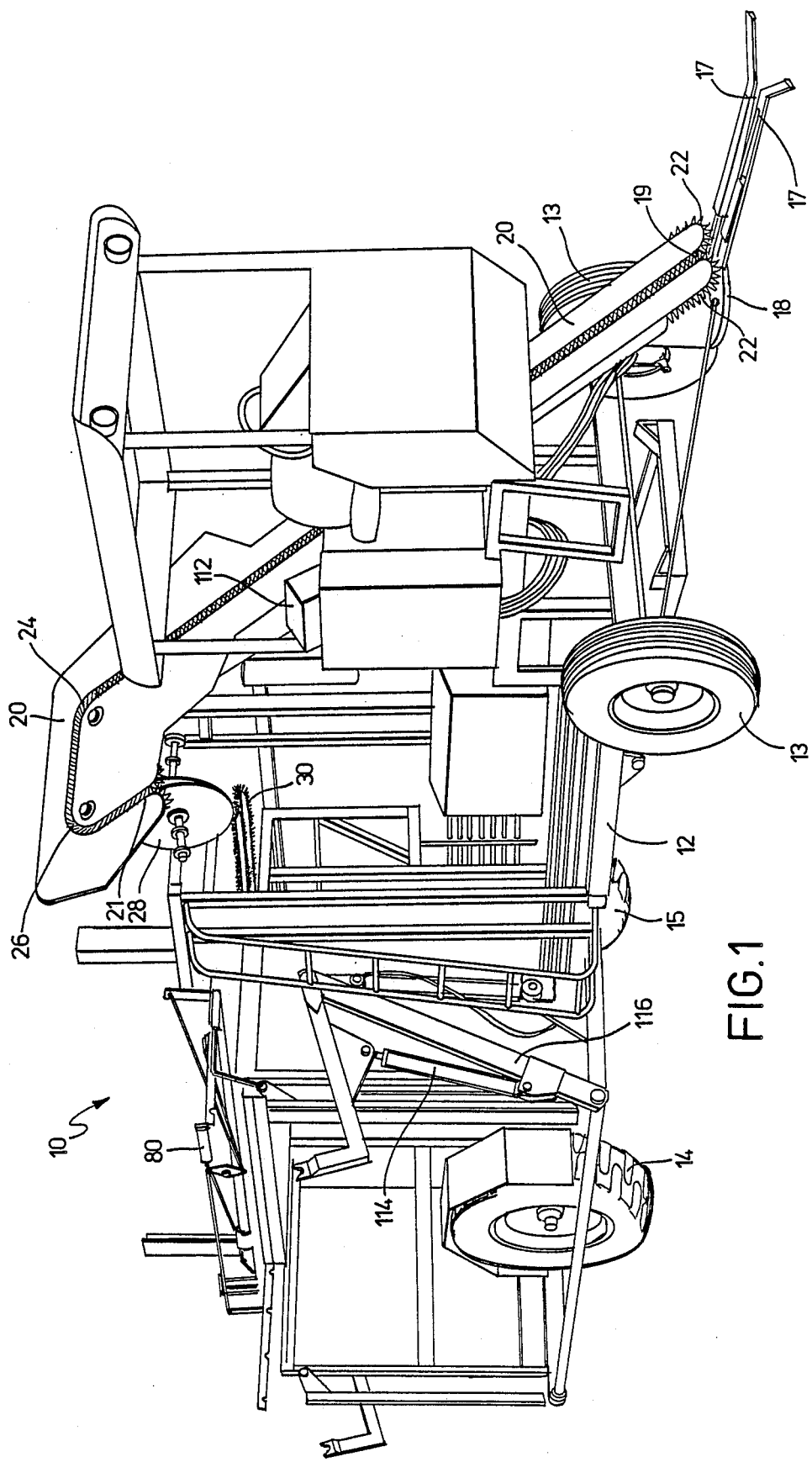
FIG. 1 is the perspective view of the automated harvester of the present invention.

Reference is now made to FIG. 1 showing the automated harvester 10 of the present invention for more efficiently harvesting burley tobacco or other, like plants. The harvester 10 includes a frame 12 mounted on wheels 13, 14. The rear wheels 14 are driven by an hydraulic motor 15 shown schematically in FIG. 18 that powers the harvester along the rows of plants in the field.

The harvester 10 utilizes a semi-automatic guidance system 16 to follow along the row of mature tobacco plants. The guidance system 16 includes a pair of cooperating, laterally spaced, mechanical tines 17. The harvester 10 is initially manually driven into alignment with the row of plants to be processed with one guidance tine 17 on each side of the stalk of the end plant of the row.

As is known in the art, as the harvester 10 proceeds along the row, the tines 17 engage the various plant stalks. When the left tine 17 engages a stalk, a microswitch (not shown) associated with that tine 17 is activated closing a circuit that causes the harvester to steer to the left. Conversely, when the right tine 17 engages a stalk, a different microswitch (again not shown) associated with this tine is activated closing a second circuit causing the harvester 10 to steer to the right. In this way, the harvester 10 is continuously aligned to follow the row of plants automatically with only minor attention from the operator. Thus, labor requirements are advantageously reduced.

As the harvester 10 moves forward along the row, a circular saw 18 is sequentially brought into engagement with plant stalks extending between the guidance tines 16. The saw 18 severs the plant stalks adjacent the ground.

The saw 18 is positioned at the entry point 19 of the pickup conveyor 20 so that the severed stalks are substantially simultaneously engaged by grouser links of opposing roller chains 22. The pickup conveyor 20 is preferably inclined at an angle of 45° with respect to the horizontal so as to elevate the plants to a level of substantially 12 feet above the ground. Angles of less than 45° may, of course, be utilized but the conveyor must be made longer to reach the desired height of elevation necessary to allow subsequent plant inversion. Thus, angles of less than 30° are not appropriate. Further, angles of greater than 45° are generally not recommended since the sudden lifting of the plants at the entry point 19 of the conveyor 20 may cause some tearing of the stalks and an increasing loss of plants proportional with increasing angle.

Once engaged by the chains 22, the plants are conveyed upward and rearward along the first section of the pickup conveyor 20 in their original vertical orientation. The conveyor 20 is operated at a speed having a horizontal component substantially equal to the harvester speed as it travels along the plant row. Advantageously, this maintains the spacing between the plants approximately as found in the field. In this way, damage to the plants from plant-to-plant contact during conveying is prevented and leaf loss is substantially reduced.

As the plants are conveyed about the first corner 24 to travel along the second section of the conveyor 20 (transverse to the direction of harvester travel), the plants are rotated 45° (i.e. the conveyor inclination angle) relative to their initial vertical orientation. Corner guides and large sprockets are utilized to minimize misalignment between adjacent chain links and resulting stalk damage. Further, shielding is provided to cover pinch points (e.g. points where a sprocket engages the chain) to further reduce leaf loss and improve harvest yield.

Similarly, as the plants are conveyed about the second corner 26, the plants are rotated an additional 45°. As a result, once the plants reach the trailing end 21 of the pickup conveyor 20, the stalks of the plants are extending in a substantially horizontal plane approximately parallel to the ground.

The chains 22 of the pickup conveyor 20 are adjusted to engage the plant stalks at least 5.5 cm, and preferably 9.5 cm above the severed or cut ends of the stalks. Thus, approximately 9.5 cm of the stalk bases extend beneath the conveyor 20. These portions of the stalks are engaged by a pair of cooperating inversion disks 28 driven at the same speed as the pick-up conveyor 20 and positioned underlying the conveyor adjacent its end 21.

As best shown in FIGS. 1-3, the inversion disks 28 have axes of rotation in a single X plane tilted such that the periphery of the discs are in contact with each other through substantially 90° between the exit of the pick-up conveyor and the entrance to the notching conveyor. Preferably, the axes form an included angle of substantially 120°. The disks 28 are formed of spring steel and include metal studs along a peripheral margin for engaging the plant stalk bases. Once engaged, the plants are rotated by the inversion disks 28 through approximately 90° and transferred from the end 21 of the pickup conveyor 20 to the beginning of the spacing and notching conveyor 30.

It should be appreciated that all together the plants are rotated through 180° and completely inverted by the pickup conveyor 20 and the inversion disks 28. When inverted, the leaves of the plants are pulled by gravity into alignment along the plant stalks. There the leaves are less susceptible to inadvertent damage and loss. By processing the plants only after they have been inverted, the present invention advantageously reduces harvesting losses to an absolute minimum and provides a harvesting efficiency of 95% or better.

The spacing and notching conveyor 30 operates at a speed relatively slower than the pickup conveyor 20. Thus, as the plants are delivered to the conveyor 30 by the inversion disks 28, the spacing between the plants is reduced. This is possible without damaging the plants since the plants are now inverted with the leaves extending along the stalks. Thus, the girth of the plants is reduced and damaging plant-to-plant contact is avoided while closer spacing of plants for subsequent curing on the portable frame F is achieved.

The spacing and notching conveyor 30 includes opposed grouser roller chains 32 substantially identical to the chains 22 of the pickup conveyor 20. The chains 32 aggressively engage the stalks and are driven to convey the plants back toward the rear of the harvester 10 in the direction of action arrow A.

As shown, the conveyor 30 serves to convey the plants past a notching mechanism generally designated by reference numeral 34. The notching mechanism 34 includes two opposed stacks of sawblades 36 about ⅝" in height. The sawblades stacks 36 are mounted on driven, vertically extending shafts above the conveyor 30 with a lateral clearance of at least ¼" and preferably ½" depending on the type of tobacco being processed. The base portions of the stalks extending above the conveyor 30 pass between the opposed sawblades stacks 36 and a ⅝" notch is cut in opposite sides of the stalks S with a ½" core C left intact (see FIG. 5). In this way, the notches are dimensioned to provide free sliding engagement with the feed track 42 and slotted track of portable frame F so as to allow automated handling as described in greater detail below.

As also shown, a separate sawblade 38 is provided on one of the vertical shafts 40 for tipping the stalks S (see particularly FIG. 4). As shown in FIG. 5, the blade 38 completely severs the stalks S above the notches to provide a standard length margin M. In this way, adequate clearance for receipt of the plant stalks S inside the continuous slotted track T of the portable curing frame F is assured (see description below).

After notching, the plants are conveyed by the conveyor 30 to the slotted feed track 42. The feed track 42 is formed from a tube including a downwardly directed opening 44 for receiving the cores C of the notched stalks S. The margin M of the stalks S is received wholly within the tube with the shoulders H of the margin engaging the walls of the tube in the area of the opening 44. The tube wall protects the margin M from inadvertent damage with the stalk S retained at the proper height and in alignment for loading onto the portable frame F by the feed conveyor 48.

As shown in FIGS. 2 and 3, the feed conveyor 48 includes a single roller chain 50 having tines 52 extending laterally at the desired plant spacing for curing. A portion of the path of the feeding conveyor 48 extends beneath the spacing and notching conveyor 30 as well as the feed track 42. Thus, as the plants are conveyed to the end of the spacing and notching conveyor 30, the stalks are engaged by the tines 52 of the feed conveyor 48. The feed conveyor 48 then continues to convey the plants at the same speed and in the same direction past cooperating guide wires 54 into a slotted track or tube T of the portable frame F.

Preferably, the feed conveyor 48 is driven by means of a step motor (not shown) to assure proper timing. In this way, it is possible to bring the tines 2 into engagement directly behind each stalk S as it is delivered from the spacing and notching conveyor 30. Consequently, spearing of the stalks with the tines 52 is avoided and the consequent possible loss of plants from damage to the stalks is prevented. As should be appreciated, however even without the use of a step motor plant losses due to spearing with tines 52 remain at acceptable low levels.

As each tine 52 engages a stalk, a plant is delivered to the slotted track T on the frame F at the proper spacing for curing. Eventually, the first plant to enter the track T reaches the opposite end of the portable frame F and the track is filled. At this point, the stalk of the lead plant engages a limit switch 58 (see FIG. 18) such as a trip lever (not shown).

Figure 18:
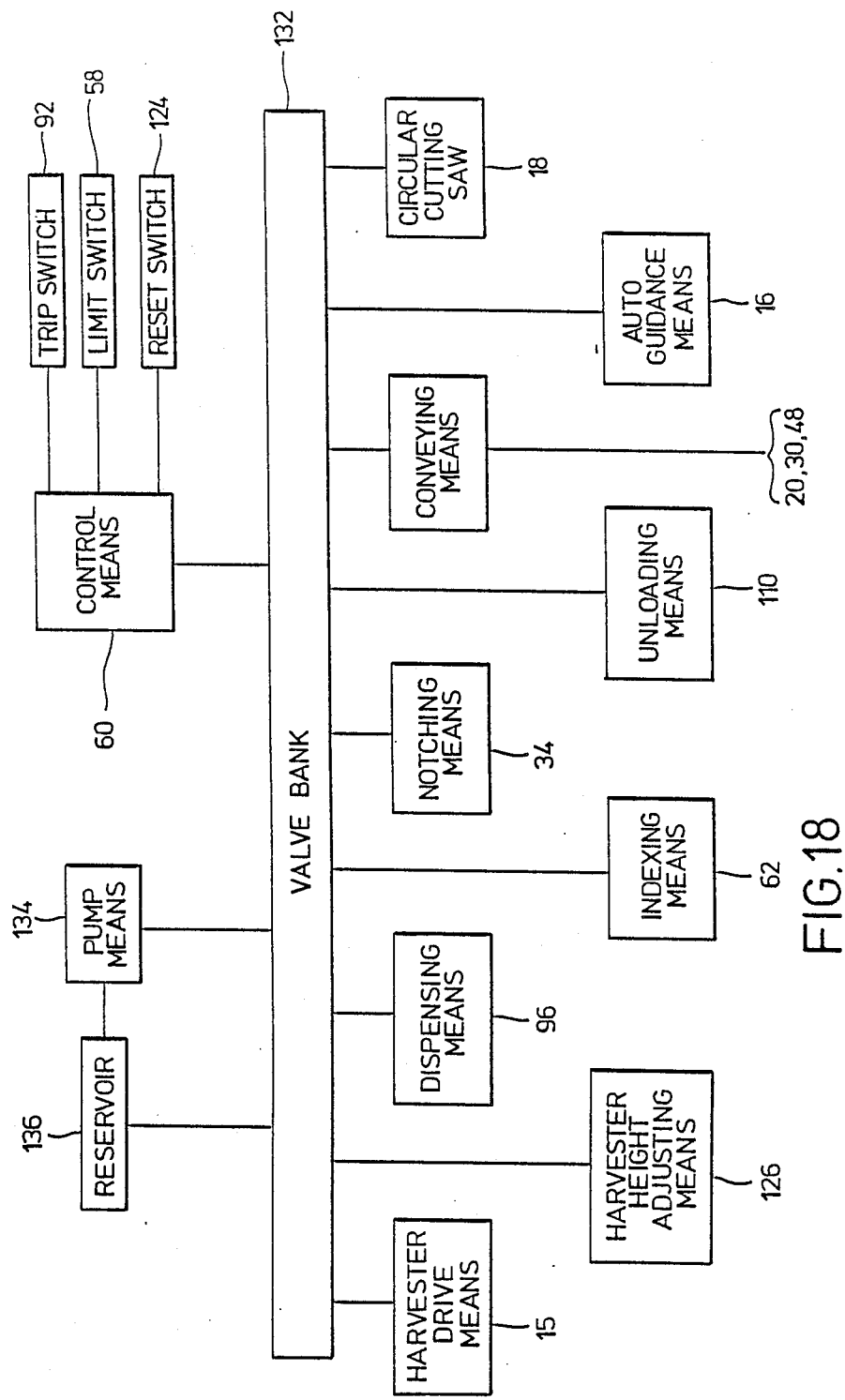
FIG. 18 is a schematical representation showing the control system of the present invention.

The tripping of the limit switch 58 produces a signal that is transmitted to the control means 60 (see FIG. 18). Preferably, the control means 60 is a programmable microprocessor controller including appropriate software for controlling various harvester operations.

Upon receiving the signal from the limit switch 58, the controller 60 activates the indexing mechanism generally designated by reference numeral 62 and shown in FIGS. 6-9. As shown, the indexing mechanism 62 includes an actuating cylinder 64 connected to a rack 66 that engages a gear 68. As the piston rod 70 is retracted, the rack 66 causes the gear 68 to revolve (see action arrow B in FIG. 7).

The shaft 72 revolves with the gear 68 thereby causing the bell crank 74 to rotate (see action arrow $B_1$). Rotation of the bell crank 74 causes a characteristic smooth acceleration and deceleration of the carrier 76 as it moves in the direction of action arrow $B_2$ from the initiating position shown in FIG. 6 to the portable frame advancing position shown in FIG. 7.

The carrier 76 may be formed from an angle iron that includes a series of equally spaced slots along its entire length. Each slot is designed to engage a control pin P mounted to each portable frame F (see FIG. 8). Thus, as the carrier 76 is displaced by the bell crank 74 to the advancing position shown in FIG. 7, the portable frame F is advanced along the guide track 78 the exact distance required to bring the next slotted track T into alignment with the feed track 42 and feed conveyor 48 of the harvester 10 for filling with plants. Preferably, the guide track 78 includes a low friction liner of Teflon or similar material, for smooth frame sliding action.

Immediately following the advancing or indexing of the frame F to bring the next track T into the proper feeding position, the actuator cylinder 80 is activated by the controller 60 (see FIGS. 8 and 9). As the piston rod 82 of the cylinder 80 is extended, a brake 84 is extended downwardly through operation of linkage 85 into secure engagement with the top of the rail of the portable frame F to securely hold the frame in position on the guide track 78 (see action arrows C in FIG. 9). Simultaneously, the carrier 76 mounted to the control rod 88 by means of sleeve element 90 is pivoted about the rod through the action of linkage 87 so as to free the slot from engagement with the control pin P of the frame F (see action arrows D).

Figure 6:
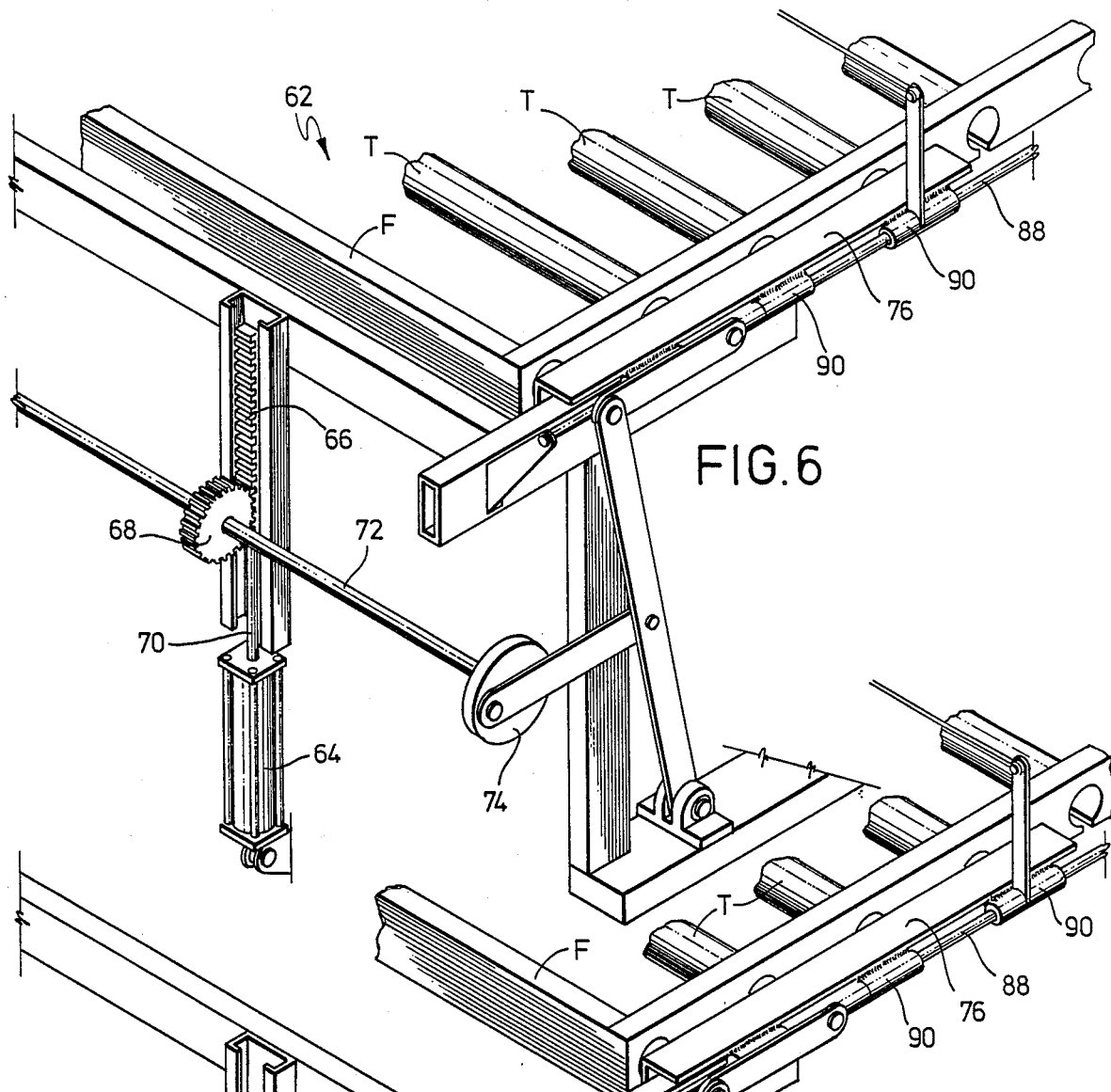
FIG. 6 is a schematical perspective view showing the indexing mechanism in position ready to advance the portable curing frame.
Figure 7:
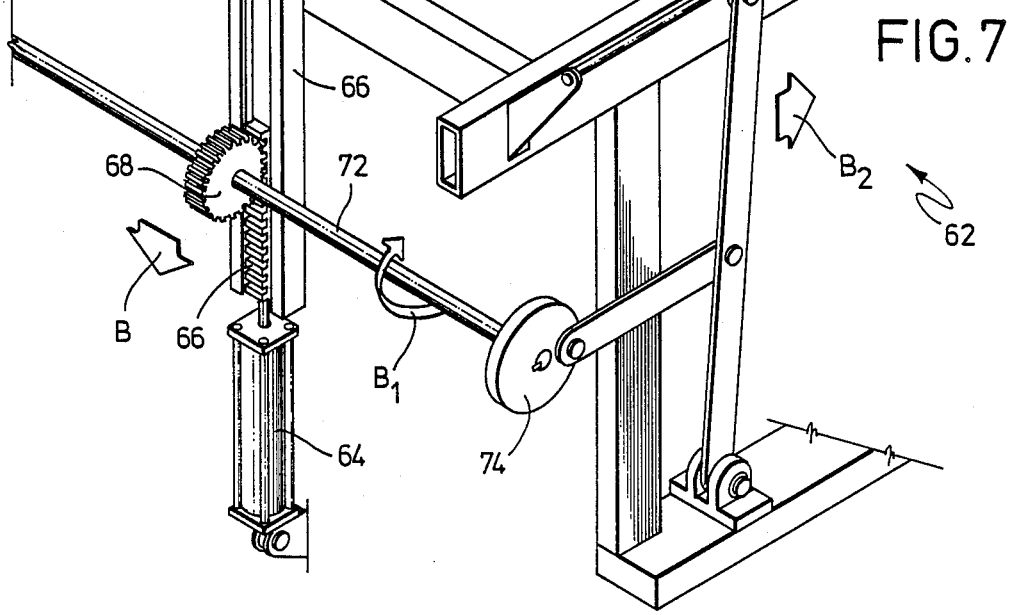
FIG. 7 is a view similar to FIG. 6 but showing the indexing mechanism following the advance of the portable frame.

The carrier 76 is then recycled to the initiating position shown in FIG. 6 by extending the piston rod 70 of the cylinder 64 as the frame F is held stationary by the clamping pressure provided by the brake 84. When the carrier 76 again reaches the initiating position, the piston rod 82 of the cylinder 80 is retracted as shown in FIG. 8 and the carrier is pivoted to bring the next slot of the series into engagement with the control pin P. Simultaneously, the brake 84 is released from the frame F. Thus, it should be appreciated that throughout the indexing process the frame F is positively engaged by either the carrier 76 or the brake 84 to hold it in proper position on the guide track 78. This is true even in a rough field. Further, since the next slotted track T may be indexed into feed position in 0.5 seconds or less, it should be appreciated that there is no interruption of the feed conveyor 48 or the harvesting operation during carrier cycling.

As each track T of a frame F is filled with plants, the above-described indexing cycle is repeated. When the last slotted track T of a portable frame F is filled with plants, the indexing mechanism 62 is again activated. This time, as the bell crank 74 and carrier 76 move into the advancing position, a trigger pin mechanism (not shown) on the frame F is brought into engagement with a spring loaded passive trip switch 92 positioned at the end 94 of the track 78 (See FIG. 12). Once engaged, the trigger releases the legs L of the frame F so that they fall under the force of gravity from the retracted storage and loading position shown in dashed line in FIG. 10 to the full line vertically extended position. Leaf springs R lock the legs in the extended position.

When the trip switch 92 is engaged, harvesting operations and power to the indexing mechanism 62 are suspended by the controller 60 (as discussed in greater detail below). The frame dispensing mechanism 96 is also activated (See FIGS. 10, 14 and 15). The dispensing mechanism 96 includes an actuator cylinder 98 connected to a lift arm 100. The lift arm 100 includes a cup 102 at its distal end for engaging control pin P of a frame F. As with the indexing mechanism 62 discussed above, one dispensing mechanism 96 is provided at each side of the frame guide track 86 to engage a control pin P at each end of the frame F.

The piston rod 104 of the cylinder 98 is retracted as shown in FIG. 15 to lower the stack of frames S in the magazine rack 106 from the raised position shown in FIG. 10 to the lowered position onto the track 86. Continued retraction of the piston rod 104 causes the lift arm 100 to fall away from the control pin P under the action of gravity (see dashed line position in FIG. 15).

From this position, the piston rod 104 is then extended from the cylinder 96 until the lift arm 100 engages the spring 108 and the cup 102 is pivotally directed into engagement with the control pin P' of the next overlying frame F' (see FIG. 14). The piston rod 104 is then further extended to lift the frame F' (as well as those frames overlying it that are not shown in FIG. 14 for purposes of clarity) from the frame F that now rests on the track 86.

Following the dispensing of the next frame F on the guide track 86, the cylinder 80 is activated to pivot the carrier 76 free of the control pin of the filled frame F as shown in FIG. 9. The bell crank 74 and carrier 76 are then recycled to the initiating position by means of the cylinder 64 . After returning to the initiating position the cylinder 80 is activated to pivot the carrier 76 so as to bring the first slot into engagement with the control pin of the frame F that has just been dispensed and placed on the track 86. The engagement by the carrier 76 serves to lock the frame F in position for loading of the first slotted track T once the unloading of the previously filled frame is completed.

The unloading mechanism 110 of the present invention is then activated. As best shown in FIGS. 10, 11 and 13, controls 112 are manually manipulated to operate the actuator cylinders 114 and bring articulated control arms 116 into engagement with the control pins P at each end of the frame F. The frame F is lifted slightly from the track 86 by the control arms 116 (see FIG. 11) to remove the weight of the plant-laden frame F (plants not shown for clarity) from the track. The actuator cylinder 118 is then activated to retract the end section 120 of the track 86 and pivot that section downwardly (see action arrow E). Once the end section 120 of each side of the track 86 is in the fully retracted position shown in FIG. 13, adequate clearance is provided for unloading the frame F from the harvester 10.

A control pin engaging notch 122 at the end of each control arm 116 is specifically designed to allow the frame F to pivot in the arm during manipulation. Thus as the frame F is unloaded from the harvester 10 it remains level at all times. In this way, a minimum amount of strain is exerted on the notched plant stalks and plant-to-plant contact is avoided. As a consequence, harvesting losses are again reduced to an absolute minimum.

Once the frame F is positioned on the ground G as shown in FIG. 13, the control arms 116 may be withdrawn (see action arrow H) and returned to their rest position (see FIG. 1). The cylinders 118 are then activated to return the two track sections 104 to their extended position in which they support a portable frame F during loading with plants (see full line position in FIG. 11).

A reset switch 124 is then activated to send a signal to the controller 60. Upon receiving that signal the controller 60 restarts the harvesting operation by first activating the circular saw 18 and notching mechanism 34 and then restarting the conveyors 20, 30 and 48 as well as the harvester drive motor 15.

The height of the harvester may be adjusted so as to better adapt the harvester to specific plant types and field conditions. As shown schematically in FIGS. 16 and 17, the harvester height adjusting mechanism, generally designated by reference numeral 126, includes an actuator cylinder 128. The front wheels 13 of the harvester are mounted to the frame 12 through a beam 128 pivotally connected to the frame. The height of the harvester may be raised from the position shown in FIG. 16 by extending the piston rod 130 from the cylinder 126. This causes the harvester frame 12 to pivot upwardly from the front wheels 14 and rise from the ground G as shown in FIG. 17. Conversely, the harvester may, of course, be operated to grasp tobacco plants closer to the ground by retracting the piston rod 130 into the cylinder 126 and lowering the frame 12 relative to the front wheels 14 (see FIG. 16). This operation at a lower height may, for example, be desired where the particular variety of tobacco includes leaves extending from a base portion of the stalk.

The harvester 10 utilizes only hydraulic actuators to operate the various mechanisms. Advantageously, this permits variable speed control of all harvester processes and allows automatic operation of harvester functions by the programmable controller 60.

The control circuit is shown schematically in FIG. 18. The controller 60 operates the bank of valves 132 that direct the flow of hydraulic fluid. More specifically, hydraulic fluid is pumped by the pump 134 from the return reservoir 136 to the various operating systems of the harvester including the harvester drive 15, the harvester height adjusting mechanism 126, the dispensing mechanism 96, the indexing mechanism 62, the notching mechanism 34, the unloading mechanism 110, the conveyors 20, 30 and 48, the steering mechanism 138 and the circular cutting saw 18.

After the harvester 10 is manually driven to the field, it is positioned with the steering tines 17 extending about lateral sides of the stalk of the end plant in the row and aligned with the remaining plants in the row. The average distance between the plants in the row is input into the controller 60.

The harvester 10 is also adjusted for operation at the appropriate height depending on the type and condition of plants being harvested. This is accomplished by manually programming the controller 60 which then activates the valve bank 132 for hydraulic fluid flow to the cylinder 126. This cylinder 126 controls the operating height of the harvester 10 as described above.

Once the harvester height is set and the harvester is positioned in proper alignment, the controller 60 is activated for automated harvesting.

Once activated, the controller 60 sends a signal to the valve bank 132 to open the valves for operation of the circular cutting saw 18 and notching mechanism 34. After a short delay to allow these cutting mechanisms to reach full speed, additional valves are opened to initiate operation of the conveyors 20, 30 and 48, the steering mechanism 138 and the harvester drive 15.

The controller 60 selects the proper forward operating speed for the harvester 10 based on the spacing between plants in the row and the desired harvesting rate. Harvesting rates of up to approximately 120 plants per minute are possible utilizing the harvester of the present invention.

The speed of the pickup conveyor 20 is then automatically adjusted by the controller 60 through operation of the valve bank 132 so as to have a horizontal component substantially equal to the forward speed of the harvester. Thus, following cutting or severing of the stalks by the circular saw 18, the plants are maintained substantially at field spacing while being conveyed and elevated by the pickup conveyor 20.

Following complete inverting of the plants by the pickup conveyor 20 and inversion disks 28, the plants are engaged by the spacing and notching conveyor 30. The controller 60 automatically adjusts the speed of the spacing and notching conveyor 30 as well as the feed conveyor 48 to assure that the spacing between the plants is reduced to a distance appropriate for curing. Following notching, the plants are fed into the slotted track T of the portable frame F presently aligned with the feed conveyor 48. Once the lead plant in the track T reaches the end of the track, the stalk of the plant engages a limit switch 58. The tripping of this limit switch sends a signal to the controller 60.

Upon receipt of that signal, the controller 60 activates the valve bank 132 so as to create the appropriate hydraulic fluid flow to the indexing mechanism 62. More specifically, controlled fluid flow to the actuating cylinders 64 and 80 allows the indexing of the portable frame F as described above so as to sequentially bring the multiple slotted tracks T on the frame into position for feeding with plants.

Advantageously, the indexing of the frame F may be completed in approximately ½ second with the next slotted track T aligned with the feed conveyor 48 for filling with plants. Thus, the forward motion of the harvester 10 as well as the full operation of the conveyors 20, 30 and 48 are continuous during the indexing operation. As a result, greater harvesting efficiency is achieved.

Identical operation of the limit switch 58 and indexing mechanism 62 continue until the last slotted track T of the frame F is filled. When the indexing system 62 reaches the advancing position shown in FIG. 7 after filling of the last track T, a trigger pin on the frame F engages a passive switch 92 at the end of the frame track 86. When this occurs, the legs L of the frame F are released to drop into the extended, vertical position and harvesting operations are shut down. More specifically, the control means operates the valve bank 132 so as to stop operation of the harvester drive 15, the conveyors 20, 30 and 48, the notching mechanism 34, the circular cutting saw 18 and the indexing mechanism 62 so that this mechanism remains in the advancing position.

The controller 60 then activates the dispensing mechanism 96 for delivery of a portable frame F from the magazine stack S to the track 86. More specifically, the controller 60 opens valves of the valve bank 132 so as to operate the actuator cylinder 98. After delivery of the next frame F to the track 86 and the lifting of the overlying frames remaining in the magazine stack S, the controller 60 reactivates the indexing mechanism 62 so that mechanism is returned to its initiating position with the carrier engaging the control pin of the new frame F to be filled with plants.

Following this step, the unloading mechanism 110 is operated to unload the plant-laden frame F from the harvester 10. More specifically, certain valves of the valve bank 132 are manually controlled to provide operation of the actuator cylinders 114 and 118 as described above.

Once the unloading of the frame F is completed, the controls 112 are manipulated to return the unloading mechanism 110 to the rest position shown in FIG. 1. The reset switch 124 is then activated. The signal from the reset switch causes the controller 60 to then restart the circular cutting saw 18 and notching mechanism 34. As previously discussed, after these mechanisms reach operating speed, the harvester drive 15, and the conveyors 20, 30 and 48 are again activated by operation of the controller 60 on the appropriate valves.

In summary, numerous benefits have been described which result from employing the concepts of the present invention. Advantageously, the apparatus and method of the present invention allow increased harvesting speeds of up to 0.5 acres per hour or higher with less than 5% mechanical leaf loss under normal operating conditions. The harvester inverts the plants prior to processing to achieve this relatively low loss rate. Additionally, the harvester automatically feeds plants into the portable frames at the proper spacing for curing. Once filled, the frames may be unloaded from the harvester and covered with plastic or other material to allow curing of plants in the field. Thus, the system described eliminates the need of the farm operator to construct or maintain curing barns.

The foregoing description of the preferred embodiment of the invention has been presented for purposes of illustration and description. It is not intended to be exhaustive or limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. An apparatus for harvesting burley tobacco plants or the like from a row on the ground and placing the plants including the leaves on a portable frame for curing, comprising:
    means for cutting stalks of the plants adjacent the ground;
    conveying means for receiving said cut plants and moving said cut plants form the ground;
    means for elevating said cut plants to a sufficient height to allow inverting of said plants with said plants clearing the ground;
    means for inverting said cut plants so that the leaves of said plants extend down along the stalks;
    means for notching the cut plants by cutting at least one channel in the stalks, said channel being dimensioned for free sliding engagement with said portable frame; and
    means for substantially continuously feeding the cut and notched plants on the portable frame.

2. The harvesting apparatus of claim 1, further comprising means for dispensing said portable frame from a magazine stack of portable frames on said harvester to a position for receiving plants.

3. The harvesting apparatus of claim 1, further comprising means for indexing said portable curing frame relative to said feeding means so as to allow ordered, sequential filling of said portable frame with plants.

4. The harvesting apparatus of claim 1, further comprising means for guiding said harvester along said row of plants in said field.

5. The harvesting apparatus of claim 1, further comprising means for adjusting the cutting height of said harvester relative to said ground.

6. The harvesting apparatus of claim 1, further comprising means for unloading said portable frame from the harvester after the portable frame is filled with plants.

7. The harvesting apparatus of claim 1, wherein said conveying means includes an inclined, substantially L-shaped pick-up conveyor and a substantially horizontal spacing and notching conveyor.

8. The harvesting apparatus of claim 7, wherein said inverting means includes a pair of cooperating inversion disks, said inversion disks serving to transfer the plants from said pick-up conveyor to said spacing and notching conveyor and invert said plants curing transfer.

9. The harvesting apparatus of claim 8, wherein said inversion disks include stalk engaging means along a peripheral margin that allow the disks to securely engage a portion of the plant stalks extending below the pick-up conveyor and transfer the plants to the spacing and notching conveyor.

10. The harvesting apparatus of claim 8, wherein said inversion disks are positioned beneath a trailing end of said pick-up conveyor with the disks having axes of rotation in a single substantially horizontal plane forming an angle of substantially 120°.

11. The harvesting apparatus of claim 7, wherein said pick-up conveyor operates at a first speed and said spacing and notching conveyor operates at a second, relatively slow speed; the difference in operating speeds between the pick-up and spacing and notching conveyors serving to reduce spacing between plants as grown in the field to a spacing appropriate for plant curing on said portable frame.

12. The harvesting apparatus of claim 7, wherein said pick-up conveyor operates with a horizontal speed component substantially matching the forward speed of the harvester thereby substantially maintaining field spacing between the plants during elevation along the pick-up conveyor to prevent consecutive plants colliding together and resulting plant damage and leaf loss.

13. The harvesting apparatus of claim 1, wherein said notching means includes a spacing and notching conveyor that feeds notched plants onto a slotted stationary feed track, said feeding means including a feeding conveyor having a portion of its path coextensive with said feed track and a portion of the spacing and notching conveyor.

14. The harvesting apparatus of claim 13, wherein said feeding conveyor includes a roller chain having spaced tines for engaging plant stalks and feeding said plants from said feeding track onto said portable frames with said plants properly spaced for air curing.

15. The harvesting apparatus of claim 1, wherein said feeding means includes a limit switch for signaling when a slotted track of said portable frame is filled with plants.

16. The harvesting apparatus of claim 2 wherein said dispensing means includes an actuator and a lift arm having a cup for securely engaging a control pin on said portable frame.

17. The harvesting apparatus of claim 3, wherein said indexing means includes an actuator, a bell crank linkage and a carrier with multiple, equally spaced slots for engaging a control pin on said portable frame, said carrier being displaceable between an initiating position and an advancing position.

18. The harvesting apparatus of claim 10, wherein said indexing means further includes means for pivoting said carrier free of said control pin and brake means for clamping said control pin and brake means for clamping said portable frame in position during recycling of said carrier to said initiating position form said advancing position.

19. The harvesting apparatus of claim 5, wherein said height adjusting means includes an actuator and associated linkage for raising and lowering said cutting, conveying, elevating and inverting means relative to the ground.

20. The harvesting apparatus of claim 6, wherein said unloading means includes an actuator and a control arm including a notched ned for engaging a control pin on said portable frame.

21. The harvesting apparatus of claim 1, further comprising a guide track for supporting said portable frame during feeding and indexing.

22. The harvesting apparatus of claim 21, wherein said guide track includes a section that may be displaced rom an operative position wherein said section supports said portable frame to a retracted position providing clearance to allow said portable frame to be unloaded from said harvester.

23. The harvesting apparatus of claim 3, further comprising a harvester drive means and a control means for regulating said cutting, conveying, inverting, notching, feeding and indexing means as well as said harvester drive means.

24. The harvesting apparatus of claim 1, wherein said at least one channel extends substantially perpendicular to the longitudinal axis of said stalks.

25. A method for harvesting of burley tobacco plants or the like from a row in a field utilizing an automated harvester and a portable frame for curing, comprising the steps of:
cutting stalks of the plants adjacent the ground;
conveying said cut plants from the ground;
elevating said cut plants to a sufficient height to allow inverting of said plants with said plants clearing the ground;
inverting said cut plants so that leaves of said plants extend down along the stalks;
notching the plants by cutting at least one channel in the stalks, said channel being dimensioned for free sliding engagement with said portable frame; and
feeding said cut and notched plants onto the portable frame.

26. The automated harvesting method of claim 25, further comprising an additional step of adjusting the operating height of said harvester relative to said ground.

27. The automated harvesting method of claim 25, further comprising an additional step of dispensing one portable frame into a plant feeding position from a magazine stack of portable frame on said harvester.

28. The automated harvesting method of claim 25, further comprising an additional step of indexing said portable curing frame so as to sequentially bring multiple slitted tracks on said frame into position for feeding with plants.

29. The automated harvesting method of claim 29, wherein said feeding of plants continues during said indexing.

30. The automated harvesting method of claim 25, further comprising an additional step of unloading a plant-laden portable frame from said harvester.

31. The automated harvesting method of claim 25, further comprising an additional step of unloading plants from said portable from following curing.

32. The automated harvesting method of claim 25, wherein said notching occurs only following inverting of said plants so as to avoid substantial damage to leaves of said plant.

33. The automated harvesting method of claim 25, further comprising an additional step of spacing said plants for curing on said portable frame.

34. The automated harvesting method of claim 25, wherein said notching step includes the step of cutting two channels on substantially opposing sides of each stalk with each channel extending substantially perpendicular to the longitudinal axis of the stalk.

35. An apparatus for harvesting burley tobacco plants or the like from a row on the ground and placing the plants including the leaves on a portable frame for curing, comprising:

means for cutting stalks of the plants adjacent the ground;

conveying means for receiving said cut plants and moving said cut plants form the ground;

means for elevating said cut plants to a sufficient height to allow inverting of said plants with said plants clearing the ground;

means for inverting said cut plants so that the leaves of said plants extend down along the stalks;

means for notching the cut plants wherein said means for notching includes spaced, cooperating cutters positioned about each side of a spacing and notching conveyor, said cutters serving to cut a pair of laterally opposed notches in said stalk adjacent the cut end of said stalk as said plants are continuously conveyed past said cutters by said spacing and notching conveyor, said notches being dimensioned of free sliding engagement with said portable frame; and means for substantially continuously feeding the cut and notched plants on the portable frame.

36. The harvesting apparatus of claim 24, wherein two channels are cut in each of said stalks, said channels being on substantially opposing sides of each of said stalks.

37. The harvesting apparatus of claim 35, wherein said cutters include two stacks of sawblades substantially $\frac{5}{8}$" in height and spaced laterally from each other by substantially 1κ".

38. The harvesting apparatus of claim 35, wherein a tipper is also provided to cut an end of the stalk off a predetermined distance from said notches.

39. The harvesting apparatus of claim 38, wherein said tipper is a single saw blade driven with one of said cutters and extending above and completely across said spacing and notching conveyor.

* * * * *